United States Patent [19]

Shaffer

[11] 4,271,723
[45] Jun. 9, 1981

[54] POWER TRAIN WITH AN AUXILIARY CREEPER DRIVE SYSTEM

[75] Inventor: Walter M. Shaffer, Peoria, Ill.

[73] Assignee: Caterpillar Tractor Co., Peoria, Ill.

[21] Appl. No.: 949,590

[22] Filed: Oct. 10, 1978

Related U.S. Application Data

[62] Division of Ser. No. 743,382, Nov. 19, 1976, Pat. No. 4,132,132.

[51] Int. Cl.³ ............................................ F16H 47/02
[52] U.S. Cl. ........................................ 74/720; 74/732; 74/361; 180/53 CD; 192/87.1; 192/87.14
[58] Field of Search ................. 74/732, 661, DIG. 11, 74/361, 664, 720; 180/53 CD, 14 A; 192/87.1, 87.14

[56] References Cited

U.S. PATENT DOCUMENTS

| 2,708,800 | 5/1955 | Logus | 180/53 CD |
|---|---|---|---|
| 2,781,674 | 2/1957 | Kaerger | 74/661 |
| 2,883,015 | 4/1959 | Schroeder | 180/53 CD |
| 2,968,967 | 1/1961 | Ross | 74/732 X |
| 3,127,790 | 4/1964 | Howey | 74/661 |
| 3,151,718 | 10/1964 | Temple | 74/732 X |
| 3,176,544 | 4/1965 | Baumeister | 74/732 |
| 3,495,478 | 2/1970 | Livezey | 74/661 |
| 3,612,202 | 10/1971 | Moon | 180/14 A |
| 3,779,608 | 12/1973 | Hatcher | 180/53 CD |
| 4,132,132 | 1/1979 | Shaffer | 74/732 |

FOREIGN PATENT DOCUMENTS 234376 6/1961 Australia ............................ 180/53 CD Primary Examiner—Nile C. Byers, Jr.
Attorney, Agent, or Firm—Charles E. Lanchantin, Jr.

[57] ABSTRACT

A power train with an auxiliary creeper drive system is disclosed which includes an engine, a primary transmission having an output shaft selectively driven by the engine, an auxiliary transmission selectively driven by the engine and operatively associated with the output shaft for driving the output shaft at a creeping rate of speed, and a clutch control arrangement for automatically disconnecting the engine from driving engagement with the output shaft when the auxiliary transmission is drivingly coupled thereto. Such auxiliary creeper drive system is particularly adaptable to the transmission of a fork lift truck.

14 Claims, 4 Drawing Figures

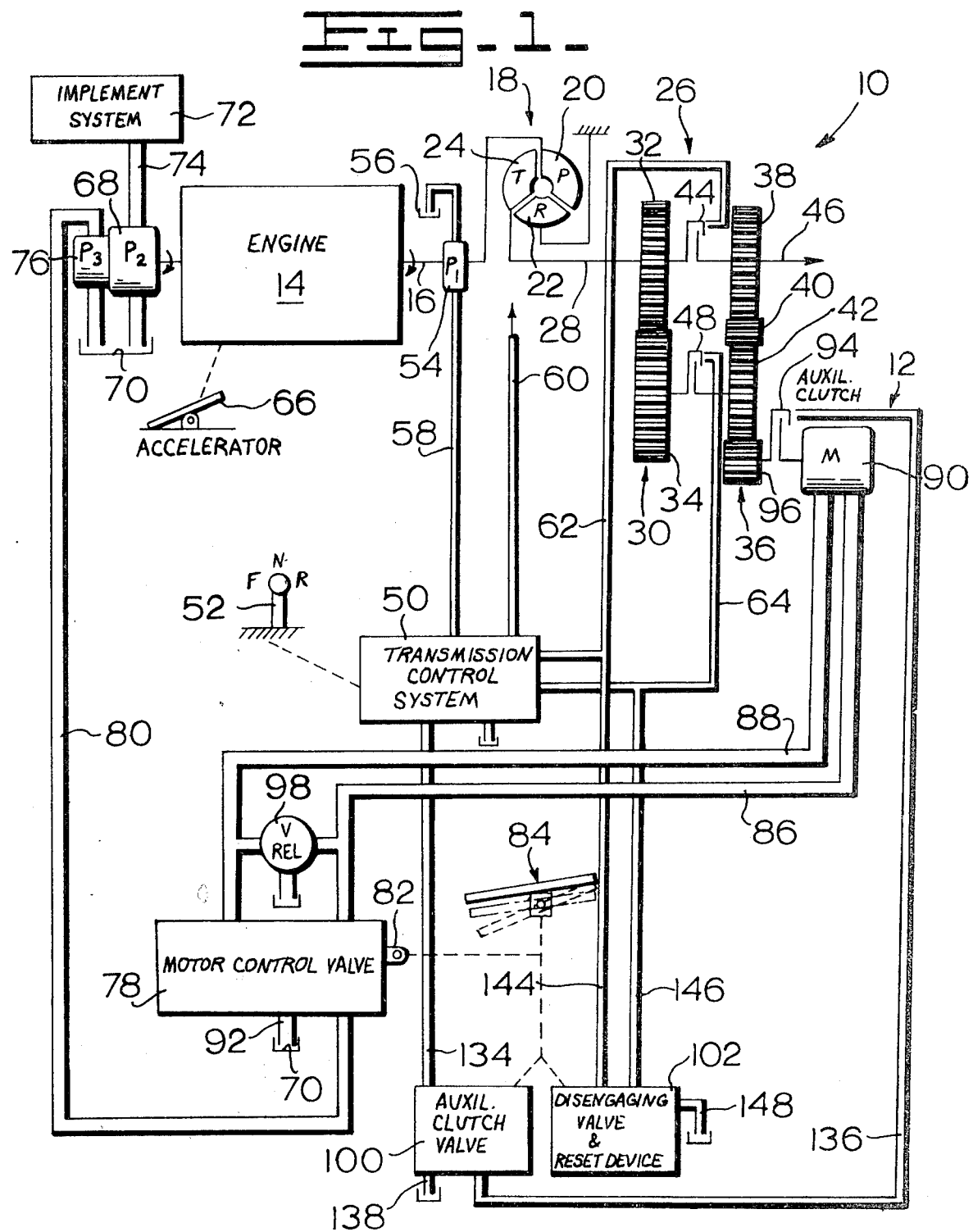

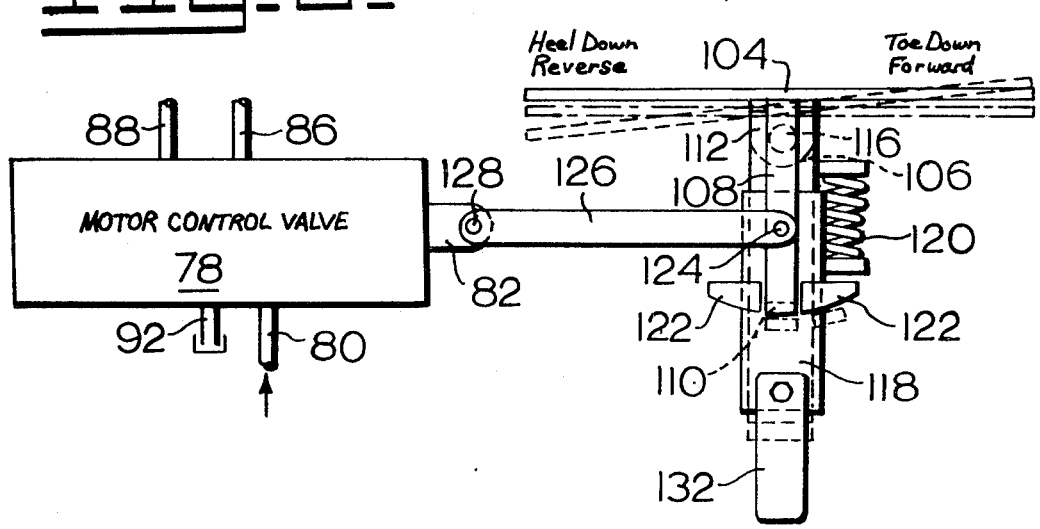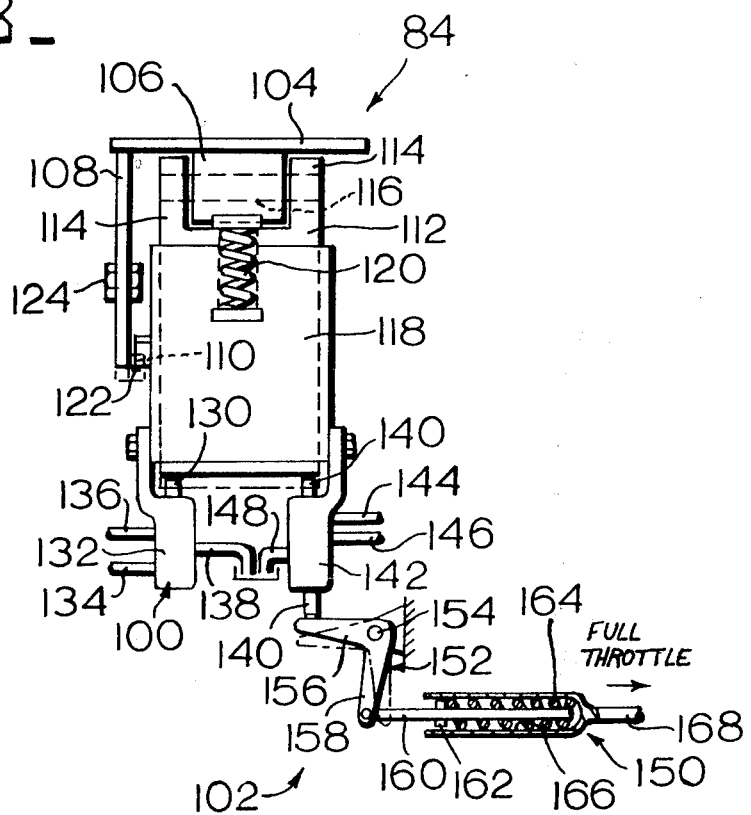

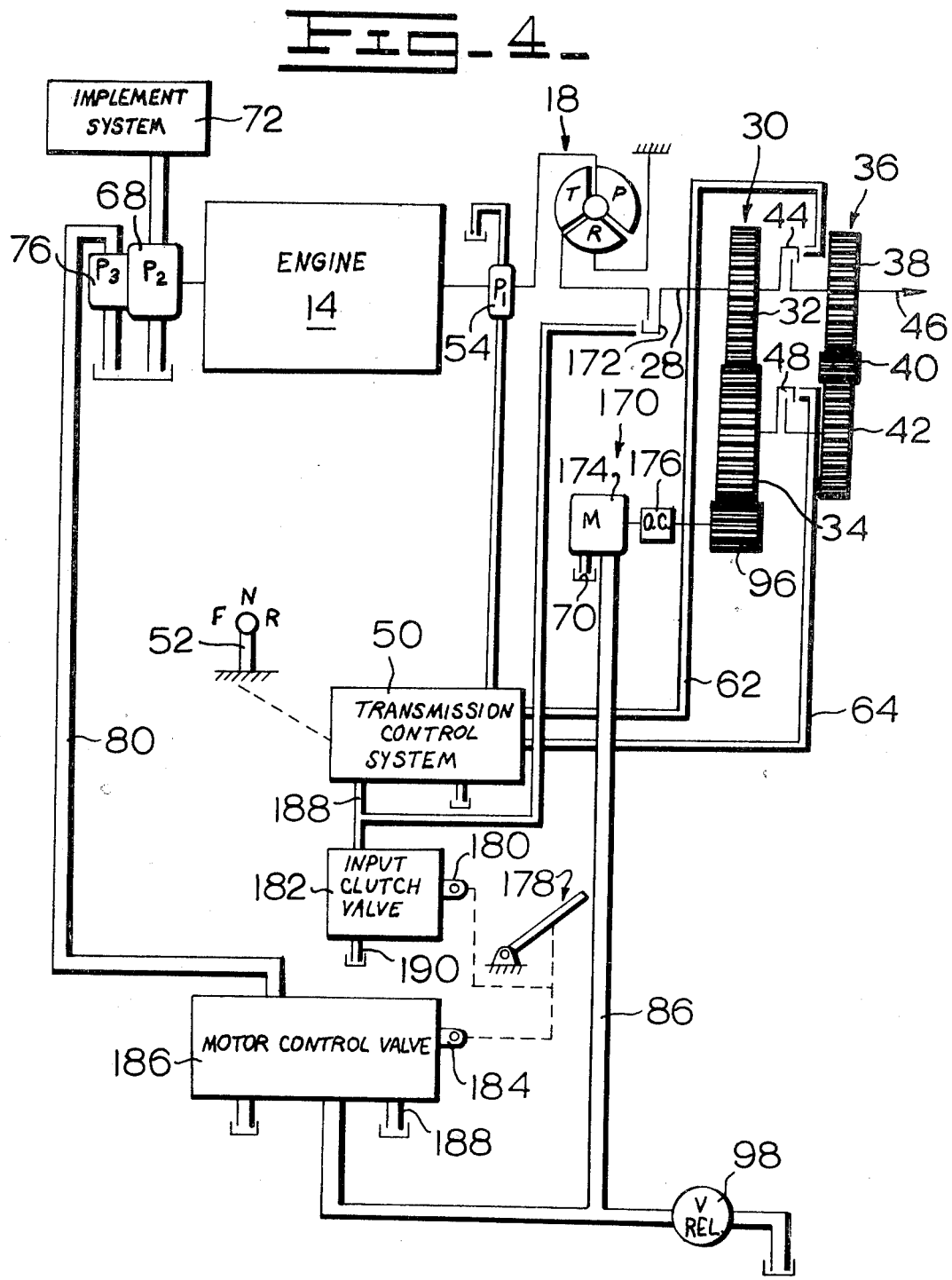

ent invention, and including a schematically displayed control arrangement therefor.

POWER TRAIN WITH AN AUXILIARY CREEPER DRIVE SYSTEM

This is a division of Ser. No. 743,382, filed Nov. 19, 1976, now U.S. Pat. No. 4,132,132.

BACKGROUND OF THE INVENTION

The present invention is related to a power train and more particularly to an auxiliary creeper drive system therefor.

Most specialized vehicles utilize multiple ratio and reversible transmissions to afford the operator a selection of ranges in which he can best operate it. However, the cost of these transmissions generally increases directly with the number of ratios employed, and consequently it is desirable to minimize the number of ratios for reasons of economy. In the case of a material handling fork lift truck, for example, a hydraulic torque converter is frequently coupled between the engine and one of these more economical reversible transmissions in order to broaden the relatively low number of operating ranges of the power train. In addition, even though the speed of the engine is varied by the operator when the transmission is in a specific ratio, it is necessary in many cases to provide sophisticated modulating control systems for creeping operation of the lift truck while operating the engine at full throttle conditions which is desirable for operation of auxiliary equipment. Specifically, precise inching of specialized work vehicles has heretofore been accomplished at full engine speed by a manually operated control system which modulatably decreases the fluid pressure to one of the engaged disc-type clutch actuating pistons to slip the interleaved clutch plates and discs of that clutch in the power train. Thus, despite the operating speed of the engine, the degree of slip of a transmission clutch can be controlled to decrease the output speed of the power train and the ground speed of the vehicle for inching purposes.

While many of the aforementioned clutch slipping systems are successfully being used by the industry, they represent costly additions to the power train. Not only are the control systems therefor complex, but also the slipping clutches must be enlarged and be extensively engineered in order for them to withstand the partially engaged, heat-generating conditions for relatively extended working periods. Moreover, even with complicated modulating systems for the clutches or torque converter transmissions, the ability to obtain precise and positive control for inching or creeping is not as good as desired.

SUMMARY OF THE INVENTION

The present invention is directed to overcoming one or more of the problems as set forth above.

According to the present invention a power train with an auxiliary creeper drive system is disclosed including a prime mover, a primary transmission having an output shaft selectively driven by the prime mover, an auxiliary transmission selectively driven by the prime mover and operatively associated with the output shaft for driving it at a creeping rate of speed, and a clutch control arrangement for automtically disconnecting the prime mover from driving engagement with the output shaft when the auxiliary transmission is drivingly coupled thereto.

BRIEF DESCRIPTION OF THE DRAWINGS

FIG. 1 is a diagrammatic view of power train incorporating the auxiliary creeper drive system of the present invention, and including a schematically displayed control arrangement therefor.

FIG. 2 is an enlarged and more detailed fragmentary side elevational view of the foot pedal actuating apparatus and the motor control valve indicated diagrammatically in FIG. 1.

FIG. 3 is an end elevational view of the foot pedal actuating apparatus shown in FIG. 2.

FIG. 4 is a diagrammatic view of a power train including a second embodiment auxiliary creeper drive system constructed in accordance with the present invention, and which may be compared with FIG. 1.

DESCRIPTION OF THE PREFERRED EMBODIMENT

Referring initially to FIG. 1, an engine driven power train 10 is disclosed which includes an auxiliary creeper drive system 12 constructed in accordance with the present invention. As is apparent from the drawing, the power train includes a prime mover or engine 14, an engine output shaft 16, and a conventional hydraulic torque converter 18 having the usual pump elements 20, reactor elements 22, and turbine elements 24 which deliver torque to a gear type primary transmission 26, and particularly to an input shaft 28 thereof.

The primary transmission 26 is generally of standard construction such as is used in a fork lift truck or similar vehicle. It has a first gear set 30 including a first gear 32 and a second gear 34 directly engaged therewith, and a second gear set 36 including a first gear 38, a second or idler gear 40, and a third gear 42. The first gears 32 and 38 of each set are colinearly arranged with the input shaft 28 are selectively coupled together through a rotating disc-type forward clutch 44, and are also colinearly arranged with respect to a power train output shaft 46. In a like manner the second gear 34 and the third gear 42 are colinear and selectively coupled together through a reverse clutch 48 of similar construction to the clutch 44. Such clutches are hydraulically engaged, and spring disengaged.

A transmission control system 50 is responsive to the movement of a manually operated control lever 52 in the usual manner to actuate the transmission 26. For this purpose a pump 54 driven by the engine 14 draws fluid from a reservoir 56 and supplies it to an input conduit 58 communicating with the transmission control system. The control system subsequently directs a controlled amount of fluid at a predetermined pressure to a conduit 60 leading to the torque converter 18 for charging and lubricating purposes. In addition, the control system selectively directs fluid to either a forward clutch piston engaging conduit 62 or a reverse clutch piston engaging conduit 64 in accordance with the manual displacement of the control lever 52. In the neutral (N) position of the lever as illustrated, the control system is effective to depressurize both of the clutches 44 and 48 so that the first and second gear sets 30 and 36 are not coupled and no torque is directed from the engine 14 to the output shaft 46. Upon selecting the forward (F) position of the lever, the conduit 62 in instantaneously activated up to a predetermined pressure level sufficient to engage the clutch 44 and cause a direct forward drive between the input shaft 28 and the output shaft 46. Similarly, upon selecting reverse (R), the conduit 64 is pressurized to engage the clutch 48 and cause a more circuitous drive through the intermeshing first and second gears 32 and 34, through the reverse clutch to the third gear 42 of the second gear set 36, and through the intermeshing idler gear 40 and first gear 38 to the output shaft.

The engine 14 can be operated at various speeds as determined by a manually operated accelerator 66 connected thereto, and an implement pump 68 is also driven by the engine to supply fluid from a reservoir 70 to an implement system 72 via a supply conduit 74. However, it may be appreciated that decreasing the speed of the engine in order to get either a low speed drive at the output shaft 46, with either clutch 44 or 48 fully engaged, would also result in a reduction in the amount of fluid provided by the implement pump to the implement system and a marked decrease in the response rate thereof. In accordance with the present invention, however, the auxiliary creeper drive system 12 will obviate such difficulty.

As diagrammatically shown in FIG. 1, the auxiliary creeper drive system 12 includes a fixed displacement, gear type auxiliary pump 76, also driven by the engine 14, which communicates fluid from the reservoir 70 at a rate of 0.43 cu. in. per revolution to a manually modulated motor control valve 78 via a supply conduit 80. Such valve includes a control spool 82 therein which is movable from a centrally biased neutral position to either a forward or reverse actuating condition by appropriate movement of a foot pedal actuating apparatus identified generally by the reference numeral 84. Pressure fluid is, accordingly, selectively directed to either a conduit 86 or a conduit 88 to a fixed displacement, gear type auxiliary motor or auxiliary transmission 90 for modulated operation thereof, with the other one of the conduits communicating return fluid back to the reservoir 70 by way of the valve and a drain conduit 92. This motor, for example, might have a capacity of 1.52 cu. in. per revolution and be rated at 3000 psi.

In the instant example, the auxiliary motor 90 is selectively connected drivingly to the second gear set 36 of the transmission 26 by way of a rotating disc-type auxiliary clutch 94 and a drive gear 96 intermeshingly coupled to the third gear 42 thereof. With engagement of the auxiliary clutch, and disengagement of both the forward clutch 44 and reverse clutch 48, fluid may be directed to the auxiliary motor through either conduit 86 or 88 to drive the gears 96, 42, 40 and 38 in either direction of rotation and to effect forward or reverse operation of the output shaft 46 at a low rate of speed.

Provision is also made for relieving excessive pressure in either the conduit 86 or the conduit 88 back to the reservoir 70 by way of a relief valve 98 having a predetermined pressure setting, and which is in continuous fluid communication with them both.

Since the power train of the present invention has two separate control systems, namely the transmission control system 50 and associated control lever 52 and also the control valve 78 and associated pedal actuating apparatus 84, it is necessary that they be coordinated in operation. In accordance with one aspect of the invention, the auxiliary drive system 12 further includes an auxiliary clutch valve 100 and a combined transmission clutch disengaging valve and reset device 102 which are responsive to movement of the pedal actuating apparatus for such coordinated operation as hereinafter described.

More specifically, and as best shown in FIGS. 2 and 3, the actuating apparatus 84 of the instant example, includes a rockable and depressable foot pedal 104 having a depending body 106, and a depending lever arm 108 with an inwardly directed tang 110 at its lower extremity. A slide member 112 having upstanding arms 114 disposed on the opposite sides of the foot pedal body supports a pivot shaft 116 which is received in the body to thereby permit the pedal to be rocked thereon. The slide member is mounted for upright sliding movement in a stationary supporting case 118 and is biased upwardly by a resilient compression spring 120 disposed therebetween. In order for the foot pedal 104 to be rocked about the pivot shaft it must be depressed along with the slide member so that the tang 110 is disengaged from an entrapped relation within a pair of spaced apart retaining members 122. Thereafter the pedal may be rocked to move a pivot joint 124 either to the left or right when viewing FIG. 2. A connecting link 126 is coupled to this pivot joint and to another pivot joint 128 on the control spool 82, so that with rocking of the foot pedal the control spool may be moved in either direction from the central neutral position thereof shown.

The depression of the foot pedal 104 and the slide member 112 simultaneously serves to actuate the auxiliary clutch valve 100 as is best shown in FIG. 3. Specifically, the lower end of the slide member is disposed in abutting contact with an upwardly biased valve spool 130, so that the spool is displaced vertically within a valve housing 132 to thereby effect open communication between a source of fluid pressure in a supply conduit 134 from the transmission control system 50 and a conduit 136 leading to the auxiliary clutch 94 as is illustrated in FIG. 1. Consequently, the auxiliary clutch is automatically fully engaged with sufficient depression of the foot pedal. With release of the pedal and upward movement of the slide member, the spool is biased upwardly to open the conduit 136 to a drain conduit 138 through the housing to thereby allow disengagement of the auxiliary clutch 94.

Furthermore, depression of the foot pedal 104 and the slide member 112 also actuates the disengaging valve and reset device 102. This is accomplished by abutting contact of the lower end of the slide member with a valve spool 140 slidably disposed within a valve housing 142. With depression of the spool a branch conduit 144 leading to the forward clutch engaging conduit 62, and a branch conduit 146 leading to the reverse clutch engaging conduit 64 are placed in open communication with a drain conduit 148. As a result, when the foot pedal 104 is initially depressed for actuation of the auxiliary creeper drive system 12, both of the clutches 44 and 48 are disconnected so that the engine 14 is no longer in driving engagement with the second gear set 36. This action takes place preferably before engagement of the clutch 94 and fluid driving of the motor 90.

The combined transmission clutch disengaging valve and reset device 102 is further responsive to the speed of the engine 14 in order to prevent the inadvertent application of high torque to the output shaft 46 upon release or upward movement of the foot pedal 104. To achieve this, the valve spool 140 is not spring loaded so that it will not automatically reset itself upon release of the pedal and upward movement of the slide member 112. Rather, the spool extends downwardly beyond the valve housing 142 and is disposed in abutting engagement with an accelerator position sensing mechanism generally identified by the reference numeral 150. Such mechanism includes a bellcrank 152 mounted on a stationary pivot joint 154, with an arm 156 in contact with the valve spool and another arm 158 in contact with a biasing rod 160. The rod has a flange 162 thereon, and a relatively light force transmitting compression spring 164 is seated thereagainst and within a pocket 166 of an accelerator element 168. The accelerator element is connected to accelerator linkage if the usual type, and not shown, to reflect a low idle condition in the position illustrated and to reflect a high idle or full throttle condition in a position to the right thereof when viewing FIG. 3. As a result, the force of the light spring 164 is only enough to move the bellcrank in a clockwise direction and to reset the valve spool 140 to an upward condition when the accelerator element 168 is disposed to the left into its low idle condition. Hence, the branch conduits 144 and 146 are blocked from the drain conduit 148 by upward movement of the spool 140, and this allows fluid flow to either the conduit 62 or the conduit 64 and engagement of the forward or reverse clutches 44 and 48 respectively only at relatively lower torque-transmitting conditions. These conditions require that in addition to release of the foot pedal 104, the accelerator 66 must be momentarily released toward low idle to a predetermined relatively low engine speed in order to reestablish converter drive. Thereafter the engine may be reaccelerated as desired.

OPERATION

While the construction and operation of the present invention is believed clearly apparent from the foregoing description, further amplification will subsequently be made in the following brief summary of the operation thereof. When the transmission control lever 52 shown in FIG. 1 is placed in either forward or reverse, the transmission control system 50 supplies pressure fluid respectively to the forward or reverse clutches 44 and 48 through the conduits 62 or 64. Accordingly, the engine 14 is disposed in driving engagement with the output shaft 46 through the torque converter 18 and the engaged transmission 26 to selectively drive it through a predetermined speed range. The operator can, of course, change the speed of the engine by suitable manipulation of the accelerator 66, but since the implement pump 68 is driven thereby the response rate of the implement system 72 is proportional thereto.

In the event that a fast rate of implement system response is desired along with a relatively low creeping speed of the output shaft 46, it is only necessary to depress the foot pedal 104 and to initiate actuation of the auxiliary drive system 12. Specifically, as best shown in FIG. 3, the valve spool 140 of the clutch disengaging valve 102 is depressed to open the conduits 144 and 146 to the drain conduit 148, and thus to assure disengagement of the forward and reverse clutches 44 and 48. Hence, while the first gear set 30 is still being driven by the engine 14, the second gear set 36 is automatically uncoupled therefrom. Simultaneously therewith, the auxiliary creeper valve 100 is actuated through downward movement of the slide member 116 and the valve spool 130 to communicate pressure from the supply conduit 134 to the conduit 136 leading to the auxiliary clutch 94 to engage it. It is to be noted that such pressure fluid would be automatically modulated up to a predetermined pressure level sufficient to engage the clutch by the internal construction of the valve 100. Such well known construction allows the rate of engagement of the clutch to be so controlled as to minimize shocks to the power train.

Subsequent rocking of the depressed foot pedal 104 in a clockwise direction when viewing FIG. 2 about the pivot shaft 116 will cause the motor 90 to be driven in a forward direction. Particularly, the lever arm 108 and the tang 110 are swung to the left to urge both the link 126 and the spool 82 to the left. This permits the supply of pressure fluid from the pump 76 and the conduit 80 to be communicated through the control valve 78 to the conduit 86 for forward operation of the motor. It is to be appreciated that the degree of creeping speed obtained through the gear set 36 is modulatably effected by the degree of rocking movement of the foot pedal. Such inching is conveniently accomplished without any slipping clutch condition and with the engine capable of operation at a full throttle condition so that the implement system 72 can be manipulated quickly into any of its working attitudes.

Release of the foot pedal 104 will automatically disconnect the auxiliary clutch 94 since the conduit 136 is opened to the drain conduit 138 through the clutch valve 100, and the motor is no longer driven since the motor conduits 86 and 88 are also opened to the drain conduit 92 through the motor control valve 78. Nevertheless, positive drive between the engine 14 and second gear set 36 is not automatically effected if the engine is operating at full throttle. In such event, the accelerator element 168 is disposed to a rightward position when viewing FIG. 3 so that there is insufficient force in the spring 164 to urge the biasing rod 160 to the left sufficiently to move the valve spool 140 upwardly via the bellcrank 152. In this circumstance the branch conduits 144 and 146 remain depressurized, and it is not until the operator manually reduces engine speed by release of the accelerator 66 and the accelerator element moved to the left that the disengaging valve 102 is reset to allow the forward clutch 44 to reengage and to permit engine-converter drive of the transmission 26.

DESCRIPTION OF A SECOND EMBODIMENT

Referring now to FIG. 4, a second embodiment auxiliary creeper drive system 170 is shown, wherein the same reference numerals have been applied to components thereof which are identical to their corresponding components in the preferred embodiment described above. This second embodiment provides an input clutch 172 between the torque converter 18 and the transmission input shaft 28, and couples an auxiliary motor 174 through an overrunning clutch 176 to the gear 96 and to the first gear set 30, rather than the second gear set as discussed in connection with the first embodiment. Consequently, the auxiliary drive motor need not be reversible since it utilizes either the forward clutch 44 or the reverse clutch 48, and the overrunning clutch is provided to prevent the motor from being overdriven by the gear 96 when the engine is driving the transmission.

In order to automatically disengage the engine 14 from driving engagement with the first gear set 30 and to connect the motor 174 thereto, a foot pedal actuating apparatus 178 is employed which is mechanically connected to a valve spool 180 of an input clutch disengagement valve 182 and to a control spool 184 of a modulatable motor control valve 186. Thus, depression of the apparatus moves the control spool 180 to the right when viewing FIG. 4 to open a normally pressurized input clutch supply conduit 188 to a drain conduit 190, to allow automatic spring disengagement of the input clutch 172. At the same time, depression of the apparatus moves the control spool 184 in a modulated manner to the right to gradually and modulatably increase communication of fluid between the supply conduit 80, the conduit 86, and to the motor. Thus hydrostatic creeping is effected, in forward if the forward clutch 44 is engaged by way of the positioning of the conduit lever 52, and in reverse if the reverse clutch 48 is engaged.

In accordance with one feature of the second embodiment, if the forward and reverse clutches 44 and 48 are reversibly engaged through manipulation of the control lever 52 when in creeping drive, the auxiliary motor 174 will be driven in reverse through the one-way acting overrunning clutch 176. Thus, the motor will act as a pump to circulate fluid in a reverse direction from the reservoir 70 through the conduit 86 and back through the control valve 186 to a drain conduit 188. Braking can thus be provided by the motor, with the degree of braking established by suitable restrictions internally of the control valve, not shown.

In view of the foregoing, it is readily apparent that the auxiliary creeper drive system of the present invention provides improved and precisely controlled inching through a hydraulic or hydrostatic pump and motor combination powered by the engine, but drivingly integrated into a conventional gear type transmission in a simple and economical manner. Moreover, inching is accomplished without the complexities and service problems associated with continually slipping clutches. It is further evident that this invention provides a relatively simple foot pedal actuating apparatus and control system which allows effective interaction between the transmission and engine speed controls, so that changeover between inching and normal engine-transmission drive is smoothly and safely accomplished.

While the invention has been described and shown with particular reference to a preferred and one alternate embodiment, it will be apparent that variations might be possible, that would fall within the scope of the present invention, which is not intended to be limited except as defined in the following claims.

The embodiments of the invention in which an exclusive property or privilege is claimed are defined as follows:

1. An engine driven power train with an auxiliary creeper drive system comprising:
    an engine;
    a transmission including an input shaft connected to said engine and a first gear set coupled thereto, an output shaft and a second gear set coupled thereto, and clutch means connected to said first and second gear sets for selectively driving said output shaft through a predetermined range of forward and reverse speeds when said engine is driving said input shaft;
    auxiliary motor means selectively coupled to one of said gear sets and selectively driven by said engine for driving said output shaft at a creeping speed slower than said predetermined range of speeds at the same engine speed; and
    control means for disengaging at least a portion of said clutch means, disconnecting said engine from driving engagement with said one of said gear sets, and connecting said auxiliary motor means drivingly to said one of said gear sets.

2. The power train of claim 1 wherein said auxiliary motor means includes a motor which is coupled to said first gear set.

3. The power train of claim 2 wherein said auxiliary motor means includes a drive gear connected to said first gear set and a motor output clutch for coupling said motor to said drive gear.

4. The power train of claim 3 wherein said motor output clutch is an overrunning clutch.

5. The power train of claim 3 wherein said clutch means includes an input clutch operatively connected between said engine and said input shaft of said transmission, said input clutch being disengaged prior to operation of said auxiliary motor means.

6. The power train of claim 1 wherein said auxiliary motor means includes a reversible motor which is selectively coupled to said second gear set.

7. The power train of claim 6 wherein said auxiliary motor means includes a drive gear connected to said second gear set and a motor output clutch connected between said motor and said drive gear.

8. The power train of claim 7 wherein said auxiliary motor means includes a pump driven by said engine and manually operated control valve means for modulatably directing fluid in either a forward or a reverse direction to said motor from said pump.

9. The power train of claim 8 including a foot pedal actuating apparatus for operating said control valve means.

10. The power train of claim 7 including means for preventing reengagement of said engine drivingly with said second gear set until a predetermined relatively low engine speed condition is reached.

11. An engine driven power train of the type including an engine, a transmission having a first gear set coupled to said engine, a second gear set coupled to an output shaft, a first clutch and a second clutch independently coupled between said first and second gear sets and separately engageable for affecting forward and reverse rotation of said output shaft, wherein the improvement comprises;
    means operatively related to said first and second clutches for disconnecting said first and second clutches to uncouple said engine from driving engagement with said second gear set; and
    reversible motor means driven by said engine and selectively coupled to said second gear set for rotating said output shaft in a creeping mode of operation.

12. The power train of claim 11 wherein said motor means includes a drive gear intermeshingly connected with said second gear set and a rotating clutch for selectively coupling said motor to said drive gear.

13. An engine driven power train of the type having an engine, a transmission having a first gear set coupled to said engine, a second gear set coupled to an output shaft, a first clutch and a second clutch independently coupled between said first and second gear sets and separately engageable for affecting forward and reverse rotation of said output shaft, wherein the improvement comprises;
    clutch means having a disengaged position for selectively disconnecting said engine from driving engagement with said first gear set; and
    motor means selectively driven by said engine and selectively coupled to said first gear set for rotating said output shaft in a creeping mode of operation upon placing said clutch means in said disengaged position.

14. The power train of claim 13 wherein said motor means includes a drive gear intermeshingly connected with said first gear set and an overrunning clutch coupling said motor to said drive gear.

* * * * *